United States Patent [19]
Chang

[11] Patent Number: 6,076,339
[45] Date of Patent: Jun. 20, 2000

[54] PROTECTIVE LINING OF GIRTH AND THE LIKE

[76] Inventor: Ju Sung Chang, 4, Lane 48, Ming-Sheng Third St., Chao Tung Township, Nan Tou Hsien, Taiwan

[21] Appl. No.: 09/270,062

[22] Filed: Mar. 16, 1999

[51] Int. Cl.[7] .................................................. B68C 1/14
[52] U.S. Cl. .................................................. 54/23
[58] Field of Search ........................................ 54/4, 23, 25

[56] References Cited

U.S. PATENT DOCUMENTS

| | | | |
|---|---|---|---|
| 3,805,491 | 4/1974 | Deal | 54/23 |
| 4,434,604 | 3/1984 | Bird | 54/23 |
| 5,426,924 | 6/1995 | Harty | 54/23 |
| 5,743,072 | 4/1998 | Chang | 54/23 |

*Primary Examiner*—Thomas Price
*Attorney, Agent, or Firm*—Bacon & Thomas, PLLC

[57] ABSTRACT

A protective lining is intended for use with a girth and the like and is provided with a plurality of air holes and elastic bodies. The air holes are arranged alternately and equidistantly. Each air hole is surrounded by a plurality of elastic bodies. The elastic bodies are provided with an uneven outer surface serving as a skidproof surface.

3 Claims, 8 Drawing Sheets

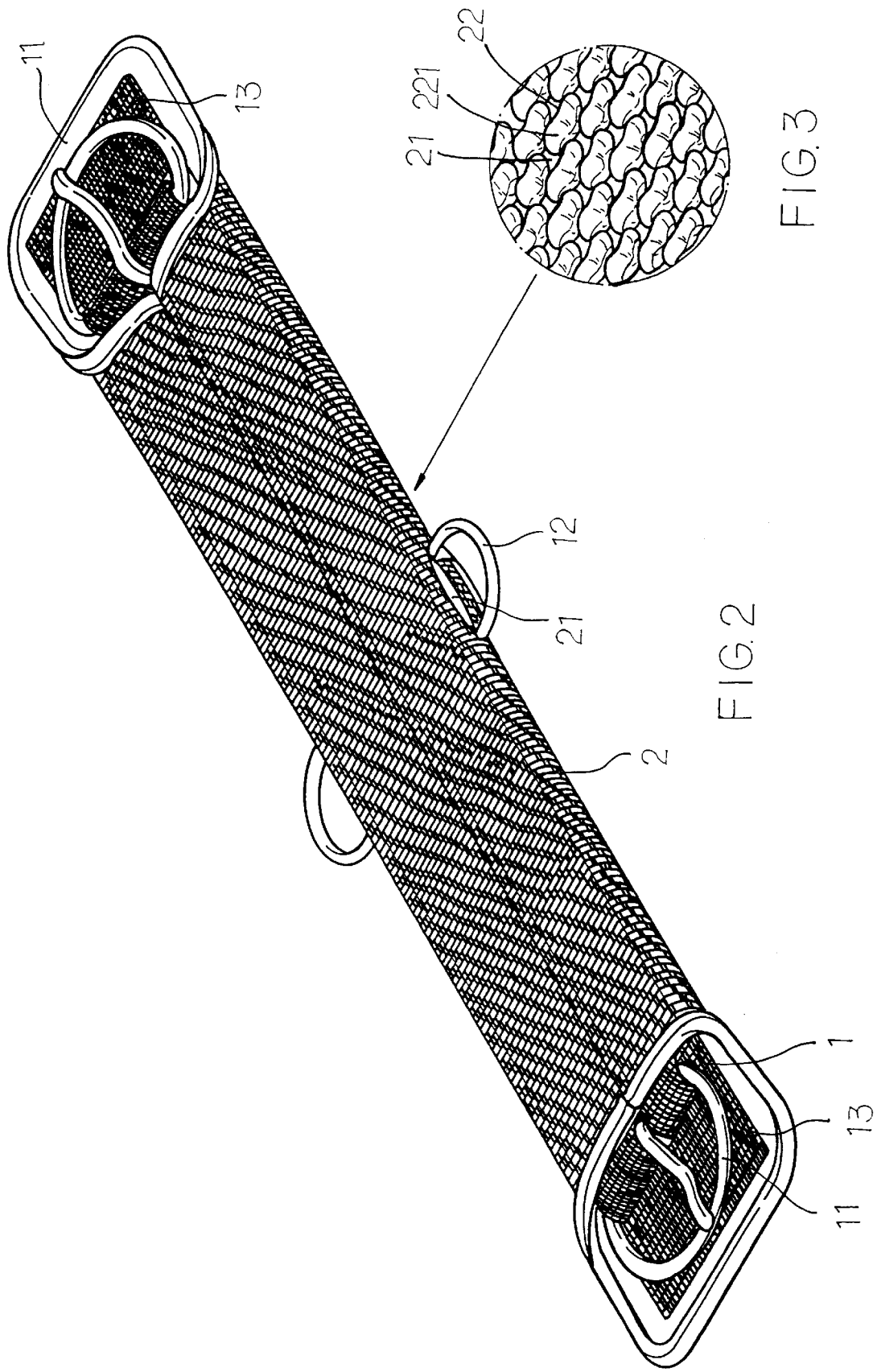

PROTECTIVE LINING OF GIRTH AND THE LIKE

FIELD OF THE INVENTION

The present invention relates generally to a horse riding equipment, and more particularly to a protective lining of a saddle girth, a saddle pad, a boot, and the like.

BACKGROUND OF THE INVENTION

The U.S. Pat. No. 5,743,072 issued to this inventor of the present invention discloses a saddle girth having a protective lining which is provided with a plurality of rounded knobs. These rounded knobs are arranged uniformly and slantingly to provide dual purposes of preventing the saddle girth from moving about and of affording a breathing effect between the belly skin of a horse and the saddle girth. The protective lining so disclosed in the afore-mentioned U.S. Patent is found to be inadequate in design in that the rounded knobs are incapable of effecting fully the intended functions thereof.

SUMMARY OF THE INVENTION

The primary objective of the present invention is therefore to provide a saddle girth with a protective lining which is capable of preventing effectively the girth from moving about and of bringing about an excellent breathing effect.

In keeping with the principle of the present invention, the foregoing objective of the present invention is attained by a girth protective lining which is provided with a plurality of air holes formed by a plurality of block bodies such that the air are equidistantly distributed. The block bodies of a softness are provided with a skidproof surface.

The foregoing objective, features, functions, and advantages of the present invention will be more readily understood upon a thoughtful deliberation of the following detailed description of the present invention with reference to the accompanying drawings.

BRIEF DESCRIPTION OF THE DRAWINGS

FIG. 2 shows a perspective view of the girth as shown in FIG. 1

FIG. 3 shows an enlarged sectional view of the protective lining of the present invention.

DETAILED DESCRIPTION OF THE INVENTION

Figure 1:
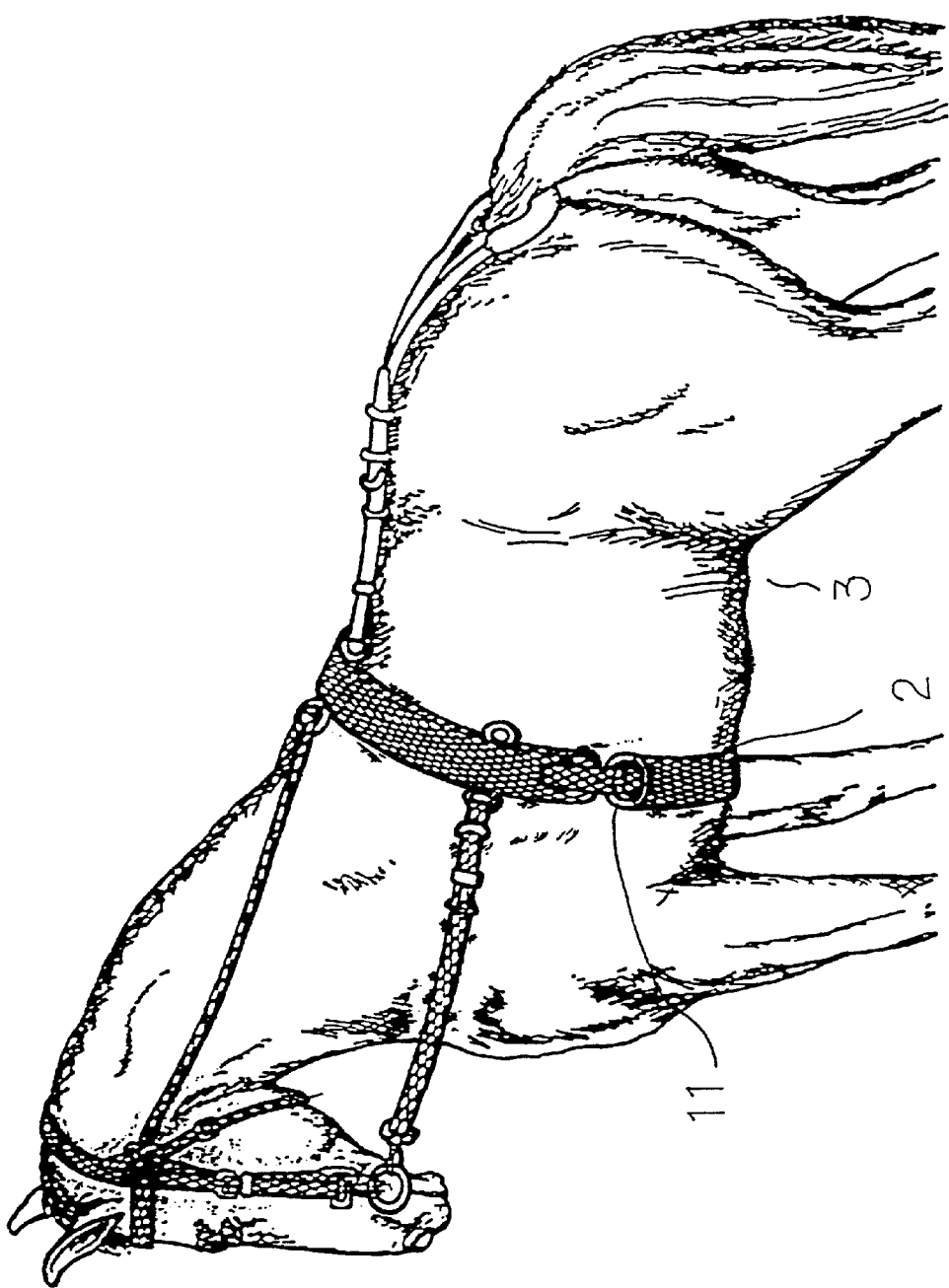
FIG. 1 shows a schematic view of a girth which is provided with a protective lining of the present invention and is put around the belly of a horse.
Figure 4:
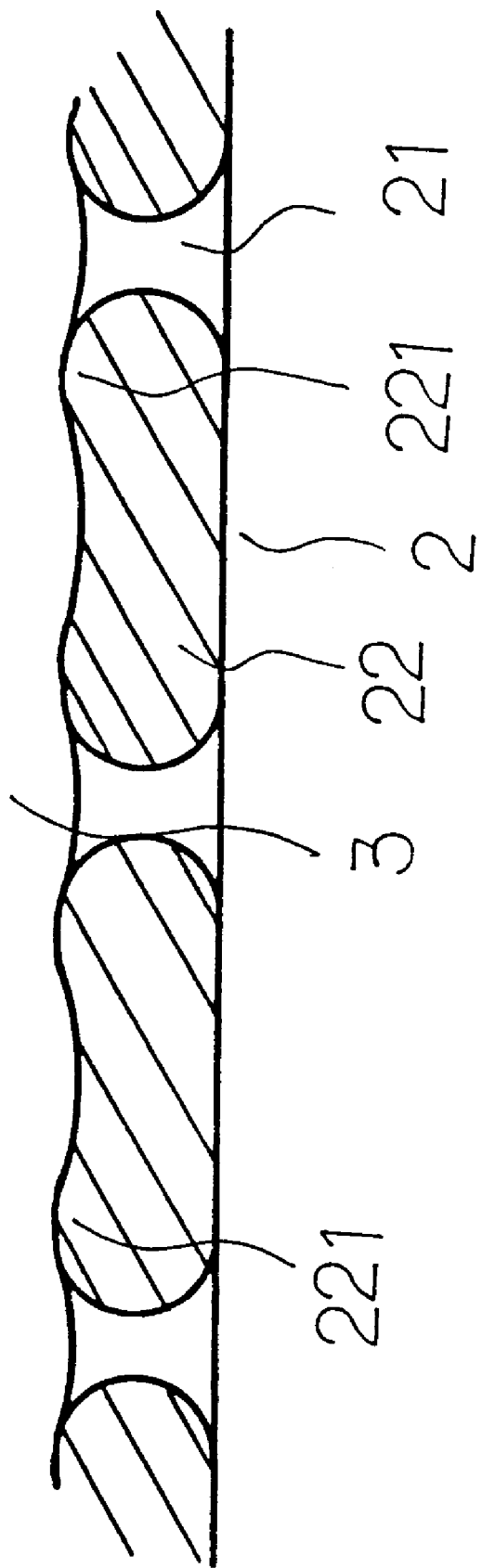
FIG. 4 shows a sectional schematic view of the protective lining of the present invention in contact with the belly skin of the horse.

As shown in FIGS. 1–4, a girth 1 is intended to put around the belly of a horse 3 and is provided at both ends thereof with a fastening segment 13 having a buckle 11 attached thereto. The girth 1 is provided at the midsegment thereof with a plurality of retaining rings 12 and through hole 21.

The girth 1 is provided with a protective lining 2 which is made of a foamed plastic material. The protective lining 2 may be made of threads by weaving. The protective lining 2 is provided with a plurality of air holes 21 which are arranged equidistantly and alternately. The air holes 21 are surrounded by elastic block bodies 22 which are provided in the outer side thereof with an uneven surface 221 serving as a skidproof surface. The girth 1 is put around the belly of the horse 3 such that the elastic block bodies 22 are in contact with the skin of the belly of the horse 3, and that the uneven surfaces 221 of the elastic block bodies 22 serve to provide friction preventing the girth 1 from moving about. The uneven surfaces 221 of the elastic block bodies 22 can provide a massaging effect to soothe the horse 3. The air holes 21 of the protective lining 2 of the present invention serve to relieve the belly of the horse 3 from perspiration, so as to provide the horse 3 with protection against the skin disorder.

Figure 5:
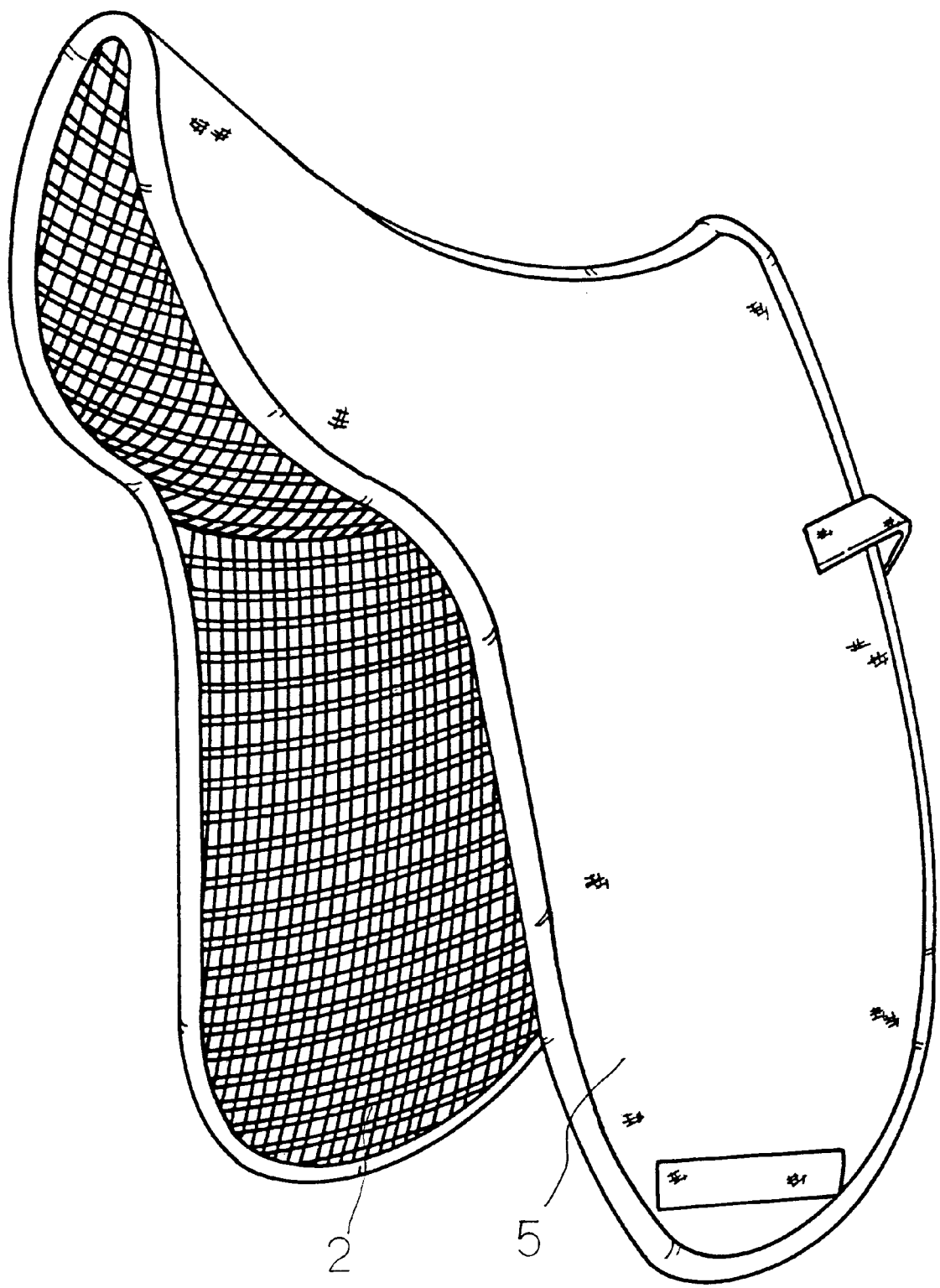
FIG. 5 shows a schematic view of a saddle pad which is provided with the protective lining of the present invention.
Figure 6:
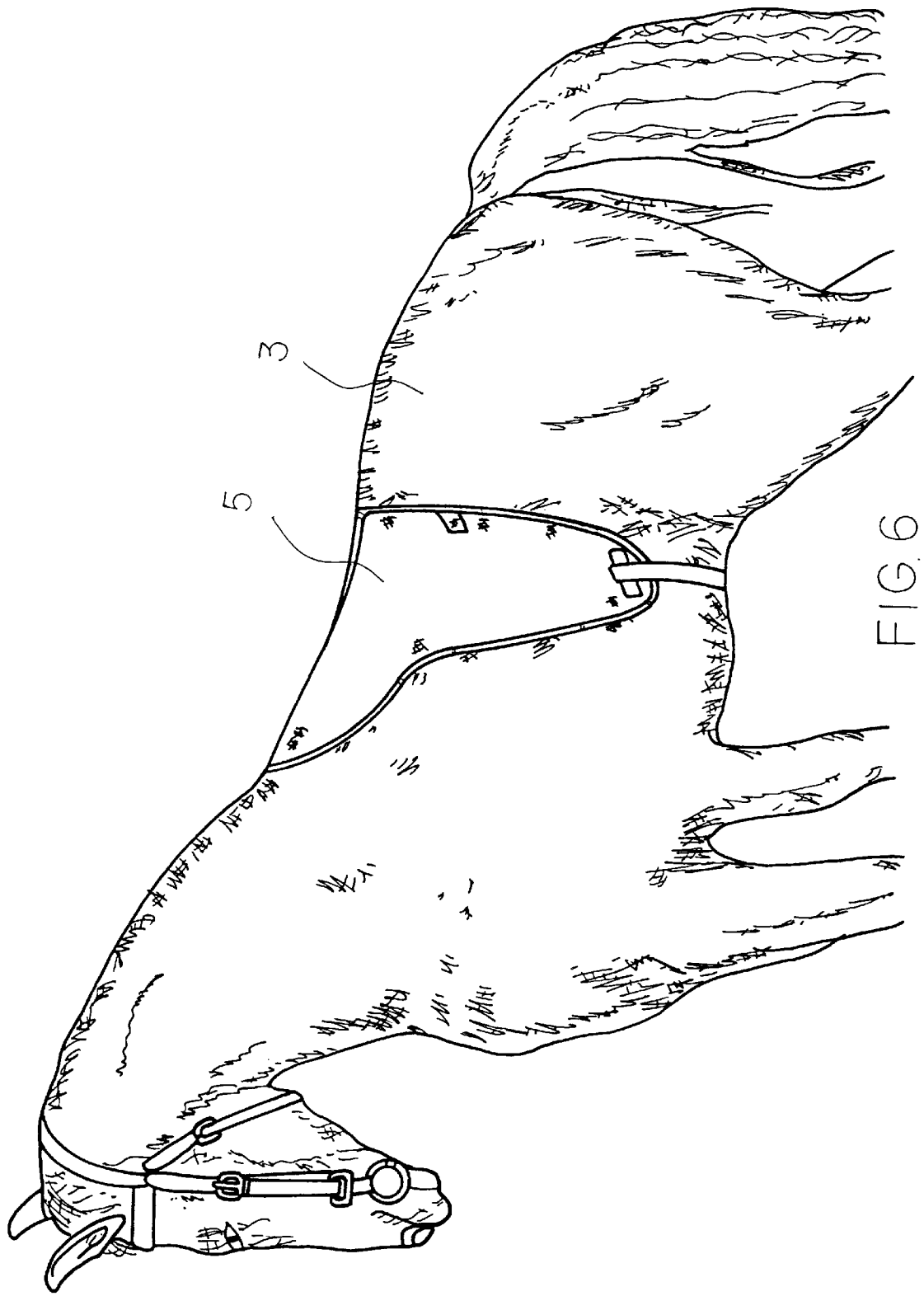
FIG. 6 shows a schematic view of the saddle pad which is shown in FIG. 5 and is put on the back of a horse.
Figure 7:
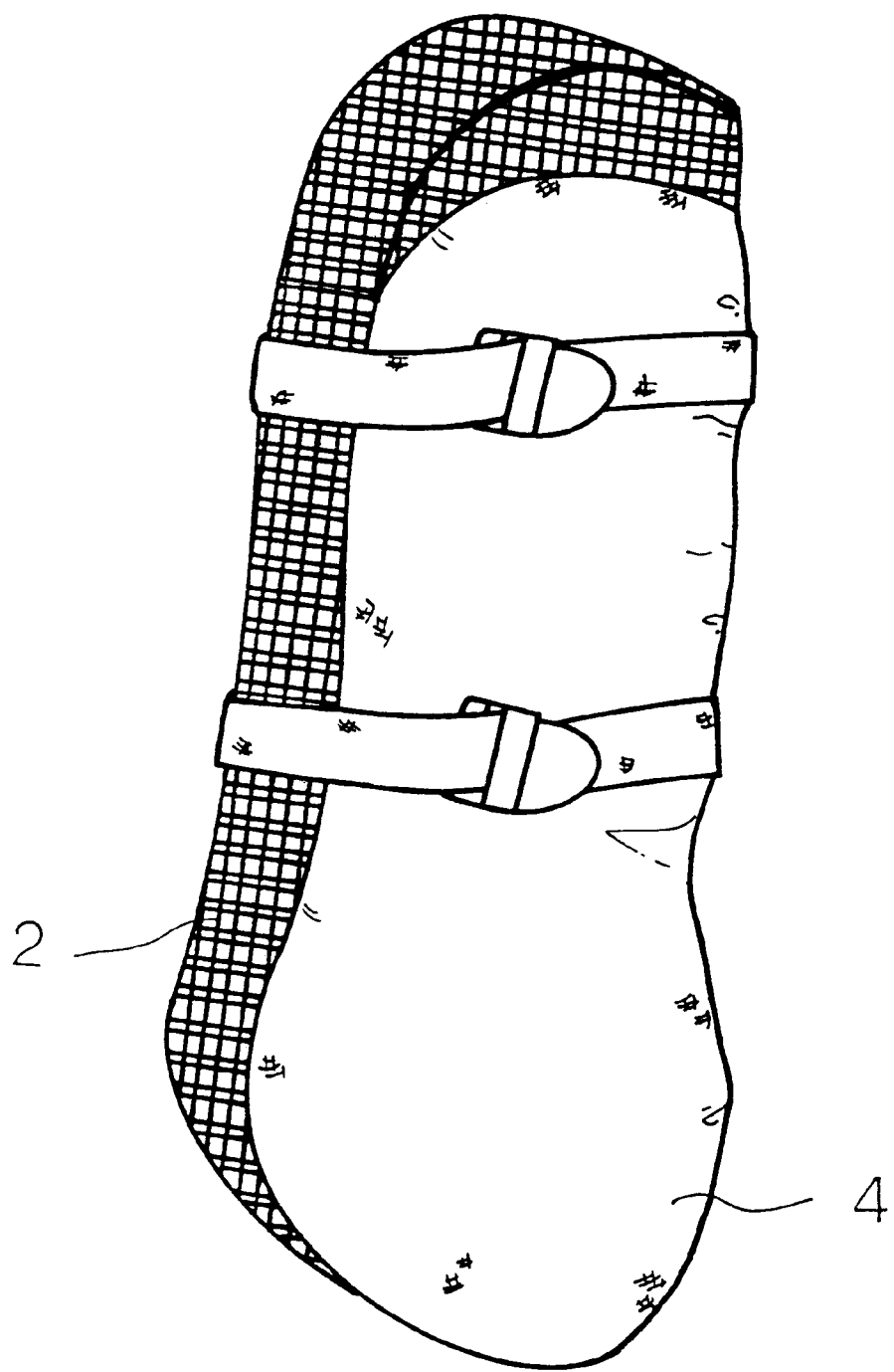
FIG. 7 shows a perspective view of a horse boot which is provided with the protective lining of the present invention.
Figure 8:
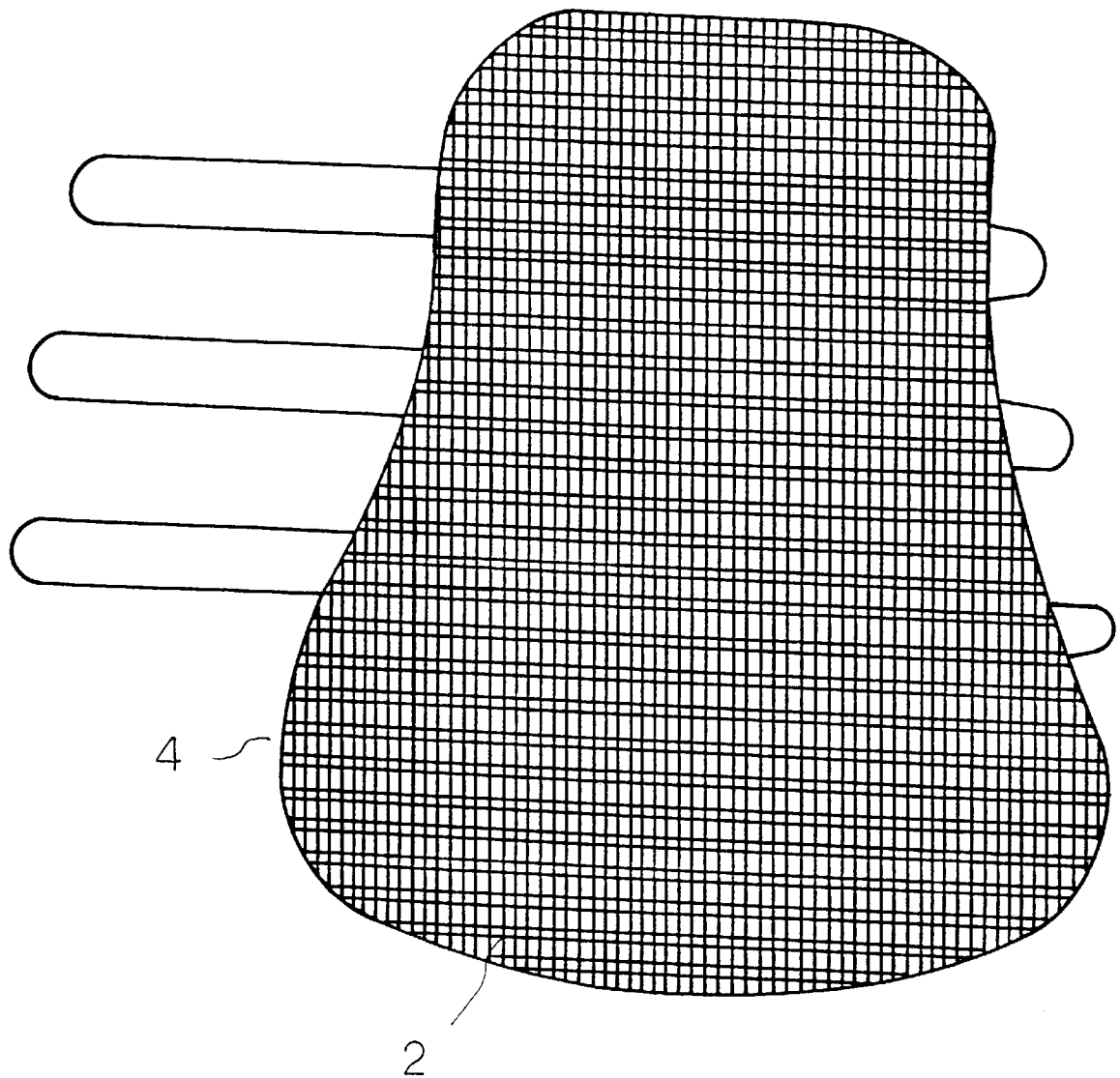
FIG. 8 shows a schematic view of the horse boot which is shown in FIG. 7 and is spread out.
Figure 9:
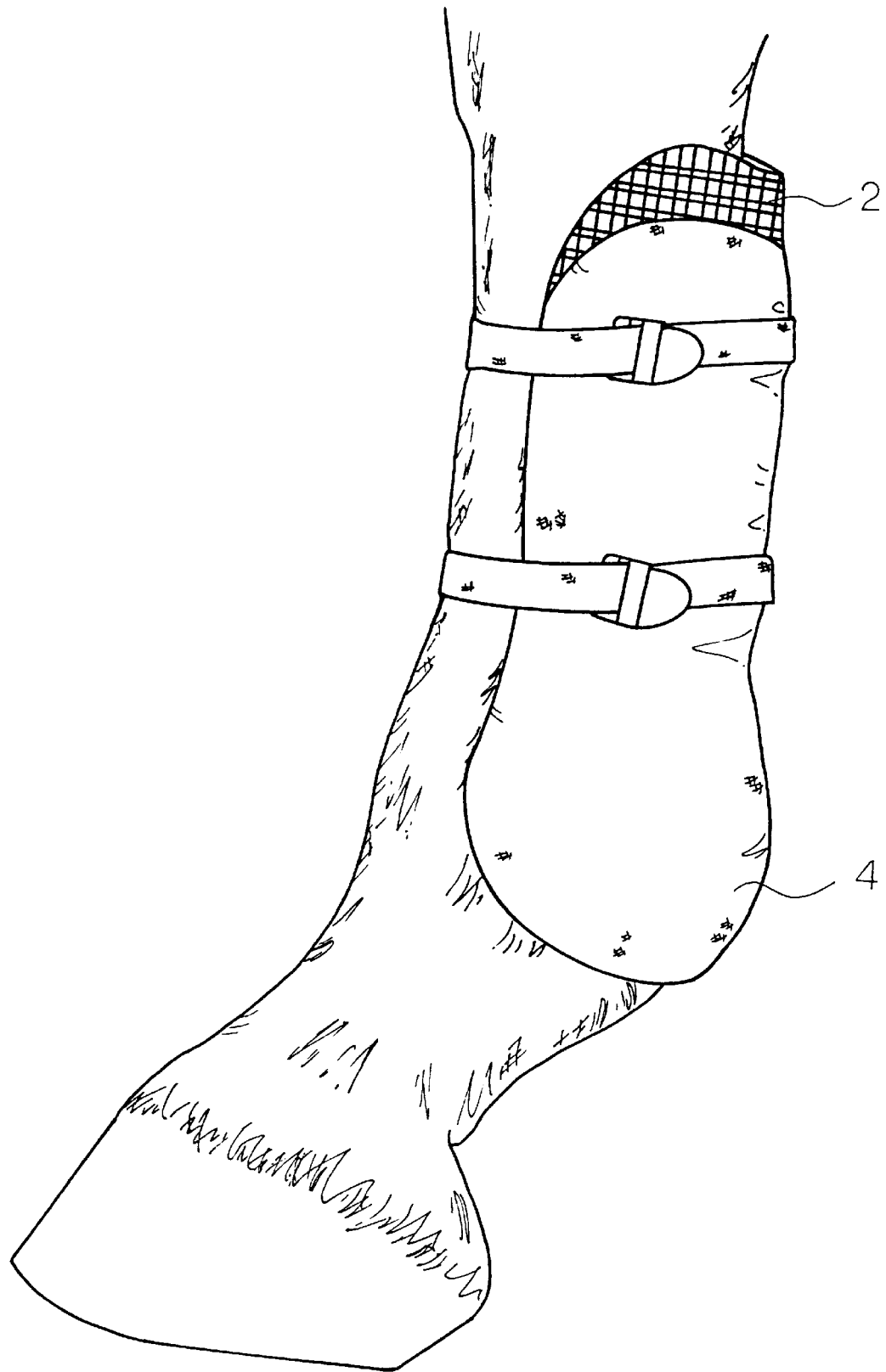
FIG. 9 shows a schematic view of the horse boot which is shown in FIGS. 7 and 8 and is put around knee and ankle of a horse.

In addition to the girth 1, the protective lining 2 of the present invention may be fastened with a horse boot 4 or saddle pad 5, as shown in FIGS. 5–9.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A protective lining of a girth and the like, said protective lining provided with a plurality of air holes and elastic block bodies surrounding said air holes, said air holes being arranged equidistantly and alternately, said block bodies being provided with an uneven outer surface.

2. The protective lining of a girth and the like as defined in claim 1, wherein said protective lining is made of a foamed plastic material.

3. The protective lining of a girth and the like as defined in claim 1, wherein said protective lining is made of threads by weaving.

* * * * *